( 12 ) United States Patent
Sugahara (10) Patent No.: US 8,638,673 B2
(45) Date of Patent: Jan. 28, 2014

(54) COMMUNICATION PATH MONITORING METHOD AND TRANSMISSION APPARATUS (75) Inventor: Hiromitsu Sugahara, Tokyo (JP)

(73) Assignee: NEC Corporation, Tokyo (JP)

( * ) Notice: Subject to any disclaimer, the term of this patent is extended or adjusted under 35 U.S.C. 154(b) by 343 days.

(21) Appl. No.: 13/147,972

(22) PCT Filed: Feb. 19, 2010

(86) PCT No.: PCT/JP2010/052504
§ 371 (c)(1),
(2), (4) Date: Aug. 4, 2011

(87) PCT Pub. No.: WO2010/095705
PCT Pub. Date: Aug. 26, 2010

(65) Prior Publication Data
US 2011/0292814 A1 Dec. 1, 2011

(30) Foreign Application Priority Data
Feb. 19, 2009 (JP) .................................. 2009-036432

(51) Int. Cl.
H04L 12/26 (2006.01)
(52) U.S. Cl.
USPC ................. 370/242; 370/252; 398/16; 398/34
(58) Field of Classification Search
None
See application file for complete search history.

(56) References Cited

U.S. PATENT DOCUMENTS 6,868,233 B2 * 3/2005 Foltzer ............................. 398/16
6,990,294 B2 * 1/2006 Ikoma et al. ..................... 398/16
7,304,957 B2 * 12/2007 Ngo et al. ...................... 370/241
7,310,315 B2 * 12/2007 Horiuchi et al. ............... 370/241
7,394,980 B1 * 7/2008 Richards ......................... 398/16

FOREIGN PATENT DOCUMENTS

| CN | 101159669 A | 4/2008 |
| JP | 1-286632 A | 11/1989 |
| JP | 2003060588 A | 2/2003 |
| JP | 2005057668 A | 3/2005 |
| JP | 2006311248 A | 11/2006 |
| JP | 2008092154 A | 4/2008 |

OTHER PUBLICATIONS

International Search Report for PCT/JP2010/052504 mailed Apr. 6, 2010.
European search report for EP10743830.1 dated Feb. 25, 2013.

* cited by examiner

Primary Examiner — Brian Roberts (57) ABSTRACT

A first transmission apparatus and a second transmission apparatus recognize the working path and the back-up path group from communication paths between the two apparatuses. The first transmission apparatus selects a measurement path from the back-up path group and transmits a test signal via the measurement path to the second transmission apparatus. The second transmission apparatus uses the test signal to measure communication quality, records the measurement data, and transmits a test signal including the measurement data via the measurement path to the first transmission apparatus. The first transmission apparatus records the measurement data included in the test signal from the second transmission apparatus, uses the test signal to measure communication quality, and records that measurement data. The first transmission apparatus selects a new measurement path from the back-up path group and transmits a test signal including that measurement data via the new measurement path to the second transmission apparatus.

11 Claims, 8 Drawing Sheets

| RECORDED TABLE OF TRANSMISSION APPARATUS 2-1 ||
| --- | --- |
| PATH 4-2 | MEASUREMENT DATA A |
|  | MEASUREMENT DATA B |
| PATH 4-3 | MEASUREMENT DATA C |
|  | MEASUREMENT DATA D |
| ⋮ | ⋮ |

FIG. 7

COMMUNICATION PATH MONITORING METHOD AND TRANSMISSION APPARATUS

TECHNICAL FIELD

The present invention relates to a technique for monitoring a communication path between transmission apparatuses.

BACKGROUND ARTS

In a communication network where a plurality of transmission apparatuses are provided, there may be a plurality of communication paths connecting between the transmission apparatuses. In such network, when the path communication quality is changed due to an occurrence of failure or the like, it is required to switch to a better path. In a case of optical communication, it is possible to switch to a proper path by using a routing technique such as GMPLS (Generalized Multi-Protocol Label Switching).

In the meantime, as a technique for monitoring the state of communication paths, there is a technique depicted in Patent Document 1 described later, for example. In Patent Document 1, depicted is a technique which periodically transmits a monitoring signal to an optical path from a transmitter side to a receiver side and monitors the state of the path.

Patent Document 1: Japanese Unexamined Patent Publication 2003-060588

DISCLOSURE OF THE INVENTION

Problems to be Solved by the Invention

Through transmitting the monitoring signal as in the technique of Patent Document 1 described above, it is possible to know the state of the paths used for transmitting information. However, even when there is a failure occurred in the path transmitting the information and the path is switched to a new path, whether or not the new path is normally working cannot be known at the current point with the technique of Patent Document 1. Thus, it is necessary to check the state of a new path every time the path is switched to a new path. Therefore, it is difficult to determine an optimum path promptly.

It is therefore an object of the present invention to provide a communication path monitoring method and a transmission apparatus for promptly switching the paths between transmission apparatuses having a plurality of paths existing therebetween.

Means for Solving the Problems

In order to achieve the foregoing object, the communication path monitoring method according to the present invention is so structured that: a first transmission apparatus and a second communication apparatus recognize a working path used for transmitting a client signal and a back-up path group other than the working path from a plurality of communication paths between the both apparatuses; the first transmission apparatus selects a measurement path from the back-up path group, and transmits a test signal to the second transmission apparatus via the measurement path; the second transmission apparatus measures a communication quality by using the test signal from the first transmission apparatus, records data of the measurement, and transmits a test signal containing the recorded measurement data to the first transmission apparatus via the measurement path; and the first transmission apparatus records the measurement data contained in the test signal from the second transmission apparatus, measures a communication quality by using the test signal from the second transmission apparatus, records the measurement data, selects a new measurement path from the back-up path group, and transmits a test signal containing the recorded measurement data to the second transmission apparatus via the new measurement path.

The transmission apparatus according to the present invention includes: a signal transmission unit which transmits a client signal from a client apparatus to a working path among a plurality of communication paths; a signal reception unit which receives a client signal to the client apparatus from the working path; a test signal transmission unit which transmits a test signal to a measurement path among a back-up path group other than the working path out of the plurality of communication paths; a test signal reception unit which receives a test signal from the measurement path; a cross connect unit which connects the signal transmission unit and the signal reception unit to the working path, and connects the test signal transmission unit and the test signal reception unit to the measurement path; and a monitoring control unit which recognizes the working path and the back-up path group from the plurality of communication paths, selects the measurement path from the back-up path group and informs the selection to the cross connect unit, measures a communication quality by using the received test signal, records data of the measurement, selects a new measurement path from the back-up path group and informs the selection to the cross connect unit, supplies a test signal containing the recorded measurement data to the test signal transmission unit, and records the measurement data when the measurement data is contained in the received test signal.

Effect of the Invention

The present invention makes it possible to promptly switch the paths between the transmission apparatuses having a plurality of paths existing therebetween.

BEST MODES FOR CARRYING OUT THE INVENTION

Figure 1:
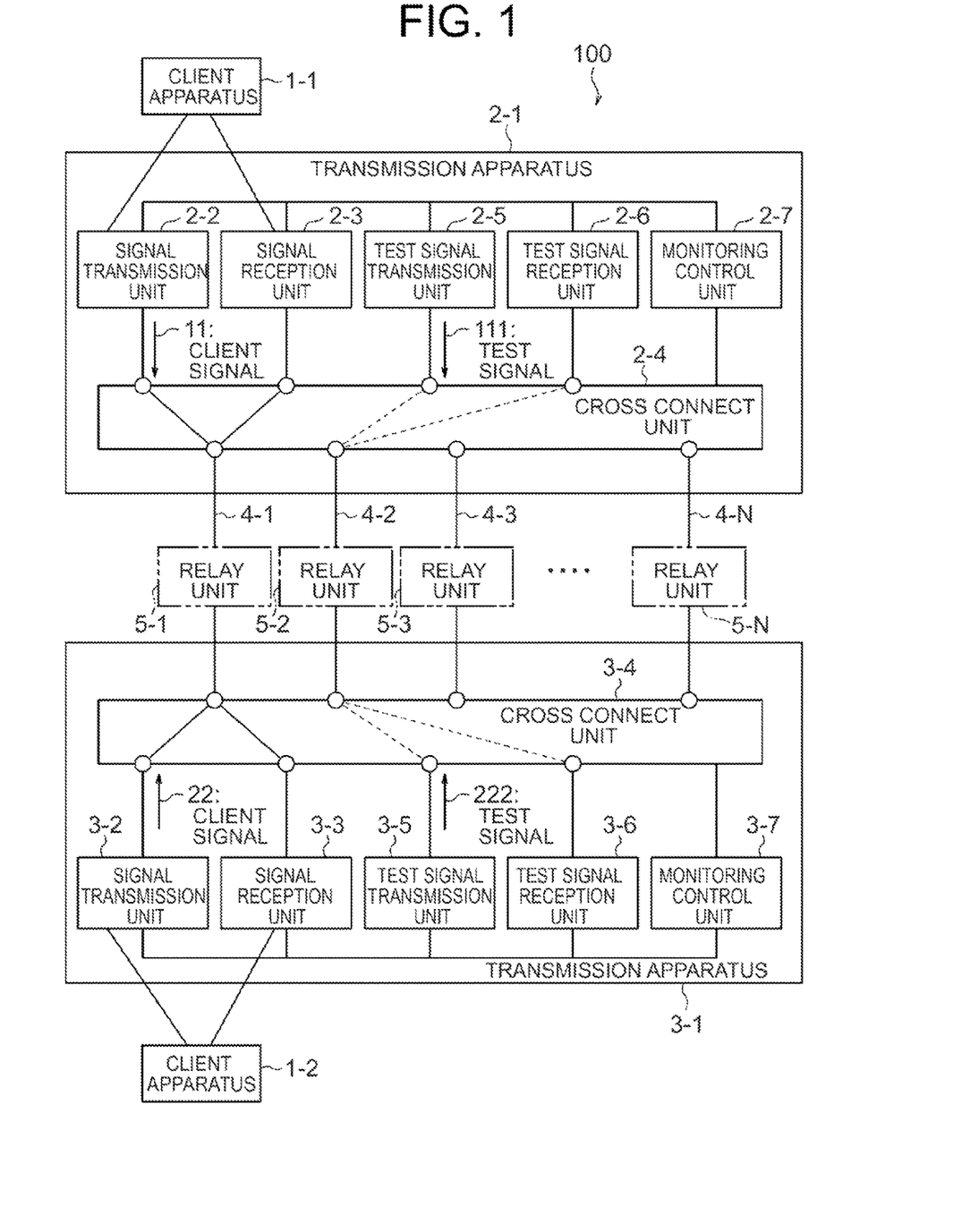
FIG. 1 is a block diagram showing a system according to an exemplary embodiment of the invention.

FIG. 1 shows a system structure of an exemplary embodiment of the invention. A system 100 of this exemplary embodiment is an optical communication system. A client apparatus 1-1 is connected to a transmission apparatus 2-1 which transmits a client signal 11 from the apparatus. A client apparatus 1-2 opposing to the client apparatus 1-1 is connected to a transmission apparatus 3-1 which transmits a client signal 22 from the apparatus. There are a plurality of transmission paths (referred to as "paths" hereinafter) 4-1 to 4-N between the transmission apparatus 2-1 and the transmission apparatus 3-1. There may be relay units 5-1 to 5-N existing on the paths 4-1 to 4-N.

Figure 2:
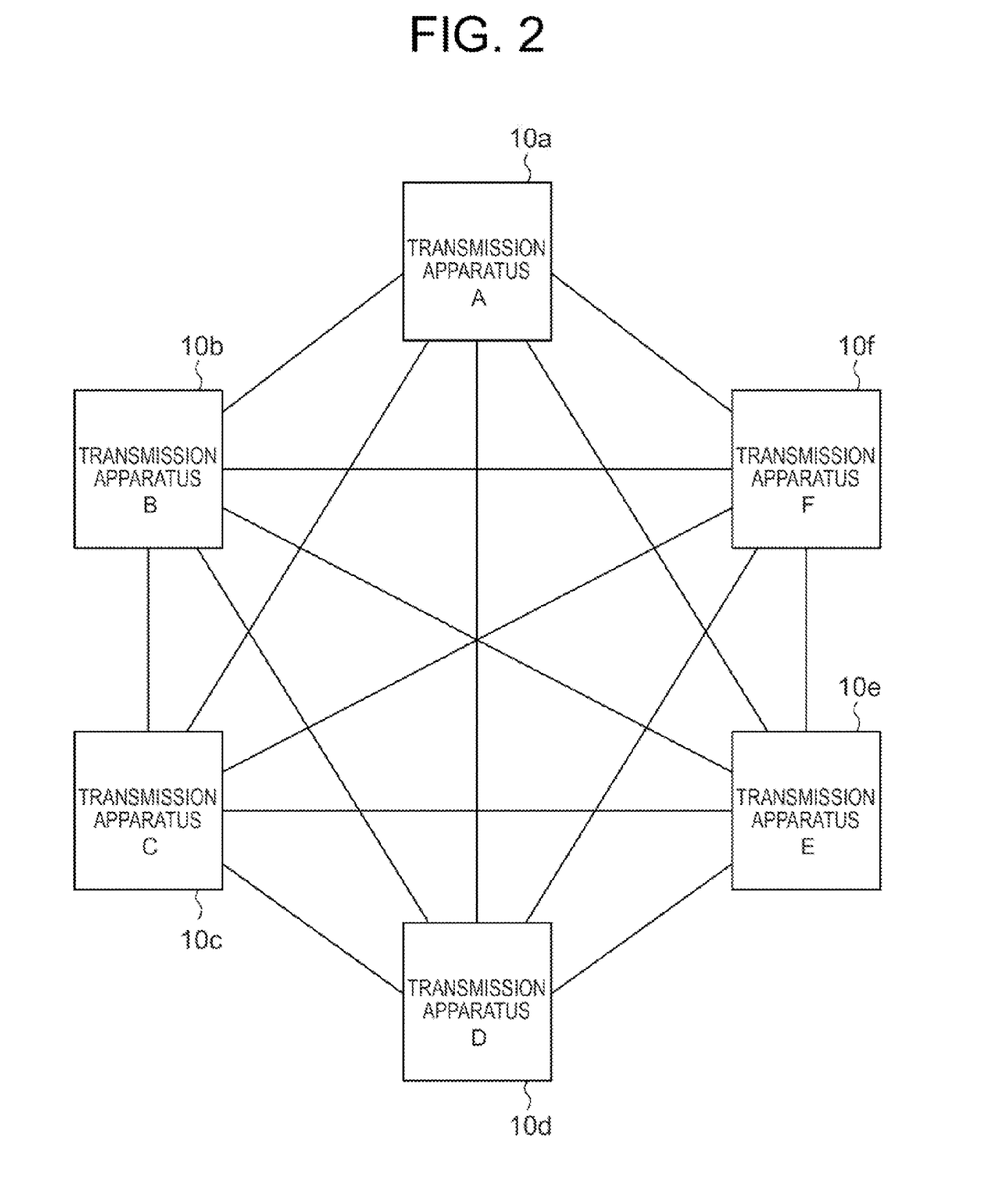
FIG. 2 is an explanatory illustration of a network structure according to the exemplary embodiment of the invention.

The transmission apparatus 2-1 and the transmission apparatus 3-1 are arbitrary two apparatuses out of the transmission apparatuses 10a to 10f (transmission devices A to F) in the network shown in FIG. 2. In the network shown in the drawing, all of the transmission apparatuses 10a to 10f have paths with each other. When a path reaching from the transmission apparatus 10a to the transmission apparatus 10c via the transmission apparatus 10b is assumed in this network, for example, the transmission apparatus 10b(B) on the midway corresponds to one of the relay units (5-1 to 5-N). In the meantime, there is no relay unit in a case of a path reaching directly from the transmission apparatus 10a to the transmission apparatus 10c.

In FIG. 1, a signal transmission unit 2-2 of the transmission apparatus 2-1 transmits the client signal 11 from the client apparatus 1-1 to the transmission apparatus 3-1 via a working path among the paths 4-1 to 4-N. A signal reception unit 2-3 receives the client signal transmitted from the transmission apparatus 3-1 to the client apparatus 1-1 via the working path. A cross connect unit 2-4 switches connections of the transmission apparatus 2-1 and a plurality of paths 4-1 to 4-N by using a widely-used cross-connect technique.

A test signal transmission unit 2-5 transmits a test signal 111 to the transmission apparatus 3-1 via a back-up path that is a communication path other than the working path out of the paths 4-1 to 4-N. A test signal reception unit 2-6 receives the test signal from the transmission apparatus 3-1. The test signal is a signal for measuring the communication quality of the back-up path, and it is handled as a signal different from the client signal. In addition to OTM (Optical Transport Module) frame, for example, it is possible as the form of the test signal to employ any forms as necessary depending on the communication quality to be measured.

A monitoring control unit 2-7 performs measurement of the communication quality using the test signal, recording of the measurement data, path switching control based on the measured data, etc. Further, the monitoring control unit 2-7 recognizes the working path and the back-up path group from the paths 4-1 to 4-N, and selects the measurement path to be a measurement target of the communication quality from the back-up path group. Information regarding the working path and the measurement path is informed to the cross connect unit 2-4. Thereby, the cross-connect unit 2-4 operates to connect the signal transmission unit 2-2 and the signal reception unit 2-3 to the working path and to connect the test signal transmission unit 2-5 and the test signal reception unit 2-6 to the measurement path.

The transmission apparatus 3-1 includes a signal transmission unit 3-2, a signal reception unit 3-3, a cross connect unit 3-4, a test signal transmission unit 3-5, a test signal reception unit 3-6, and a monitoring control unit 3-7. These are same as those of the transmission apparatus 2-1 described above, so that explanations thereof are omitted.

Operations of the transmission apparatus 2-1 and the transmission apparatus 3-1 of the above-described structure (FIG. 1) will be described. First, the processing regarding transmission of a test signal will be described along a flowchart of FIG. 3. While the operation of the case where the transmission apparatus 2-1 transmits the test signal 111 is assumed hereinafter for convenience' sake, this also applies to the case where the transmission apparatus 3-1 transmits a test signal 222.

The transmission apparatus 2-1 recognizes the working path and the back-up path group at this point from the paths 4-1 to 4-N during the transmission of the client signal 11 via the working path or at the start of transmission (step S1). As illustrated in FIG. 1, it is assumed here that the path 4-1 is the working path and the other paths (4-2 to 4-N) are the back-up path group.

The transmission apparatus 2-1 selects a measurement path that is a path as a target for measuring the communication quality from the paths 4-2 to 4-N that are the back-up path group (step S2). When the measurement path is selected, the cross connect unit 2-4 connects the test signal transmission unit 2-5 and the test signal reception unit 2-6 to the measurement path. A measurement path selecting method is defined in advance between the both apparatuses (2-1, 3-1). For example, in a case where the back-up path group is constituted with the paths 4-2 to 4-N, it is defined to select the paths in order of the path 4-2→ the path 4-3→ - - - → the path 4-N.

Subsequently, the transmission apparatus 2-1 checks whether or not there is data that is not informed to the transmission apparatus 3-1 among the measurement data recorded at this point (step S3). While the details are to be described later, the measurement data is data in which the communication quality of a given path is written. Whether or not the measurement data is uninformed can be recognized by setting a flag indicating that the measurement data is uninformed to a register every time when recording the measurement data, for example. In the initial state of path monitoring, there is no uninformed measurement data. In that case, the transmission apparatus 2-1 transmits the test signal to the transmission apparatus 3-1 via a selected measurement path (step S4).

In the meantime, when there is uninformed measurement data at the point of transmitting the test signal (step S3: Yes), the transmission apparatus 2-1 reads out the measurement data and adds it to a test signal of this time (steps S5, S6), releases the uninformed flag (step S7), and transmits the test signal to which the measurement data is added to the transmission apparatus 3-1 (step S4).

Figure 4:
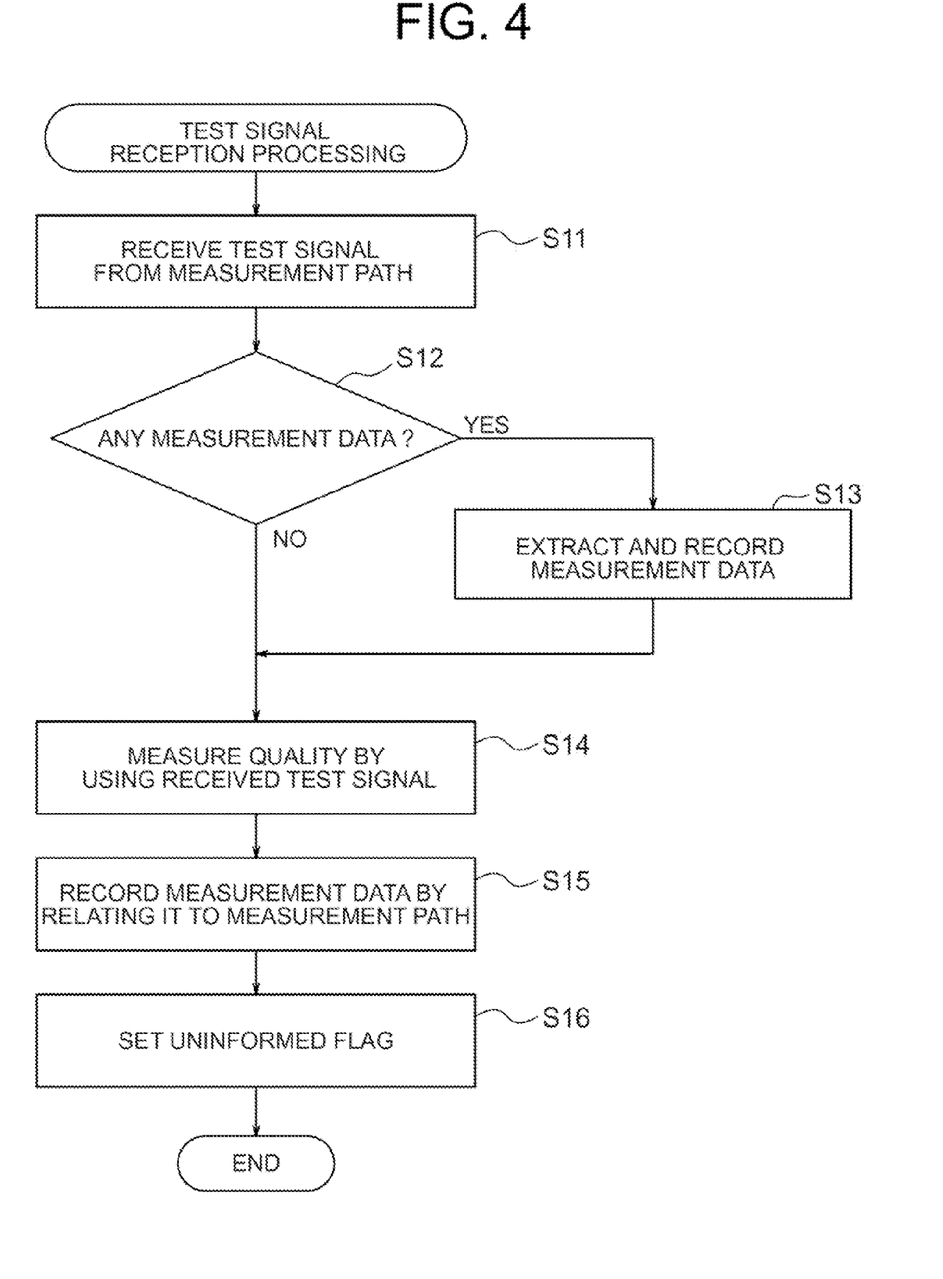
FIG. 4 is a flowchart regarding reception of the test signal according to the exemplary embodiment of the invention.

The processing regarding reception of the test signal will be described along a flowchart shown in FIG. 4. While the operation of the case where the transmission apparatus 3-1 receives the test signal 111 from the transmission apparatus 2-1 is assumed hereinafter, this also applies to the case where the transmission apparatus 2-1 receives the test signal 222.

When the transmission apparatus 3-1 receives the test signal 111 from the transmission apparatus 2-1 via the measurement path (step S11), the transmission apparatus 3-1 checks whether or not the test signal 111 contains the measurement data. When the measurement data is not contained therein, the processing is shifted to a next step (step S12: No). Further, when the test signal 111 contains the measurement data (step S12: Yes), the transmission apparatus 3-1 extracts and records the measurement data (step S13). At this time, the measurement data is recorded in such a manner that the measurement path shown in the measurement data can be identified which one of the paths it is.

Subsequently, the transmission apparatus 3-1 measures the communication quality by using the received test signal 111 (step S14). For the communication quality to be measured, it is possible to employ information required for evaluating the communication quality of the path, such as the signal error rate of the test signal 111, transmission loss, S/N ratio (SNR: Signal to Noise Ratio), and time required for transmission.

For measuring the signal error rate, a redundant code for error detection, for example, is set to the test signals (111, 222).

The transmission apparatus 3-1 records the measurement data as the measurement result by relating it to the measurement path through which the test signal 111 of this time is transmitted (step S15), and sets the above-described uninformed flag to be valid (step S16). Thereby, the transmission apparatus 3-1 can recognize from the flag that there is the measurement data to be added to the test signal 222 when transmitting the test signal 222 to the transmission apparatus 2-1 later, i.e., there is the uninformed measurement data.

Figure 3:
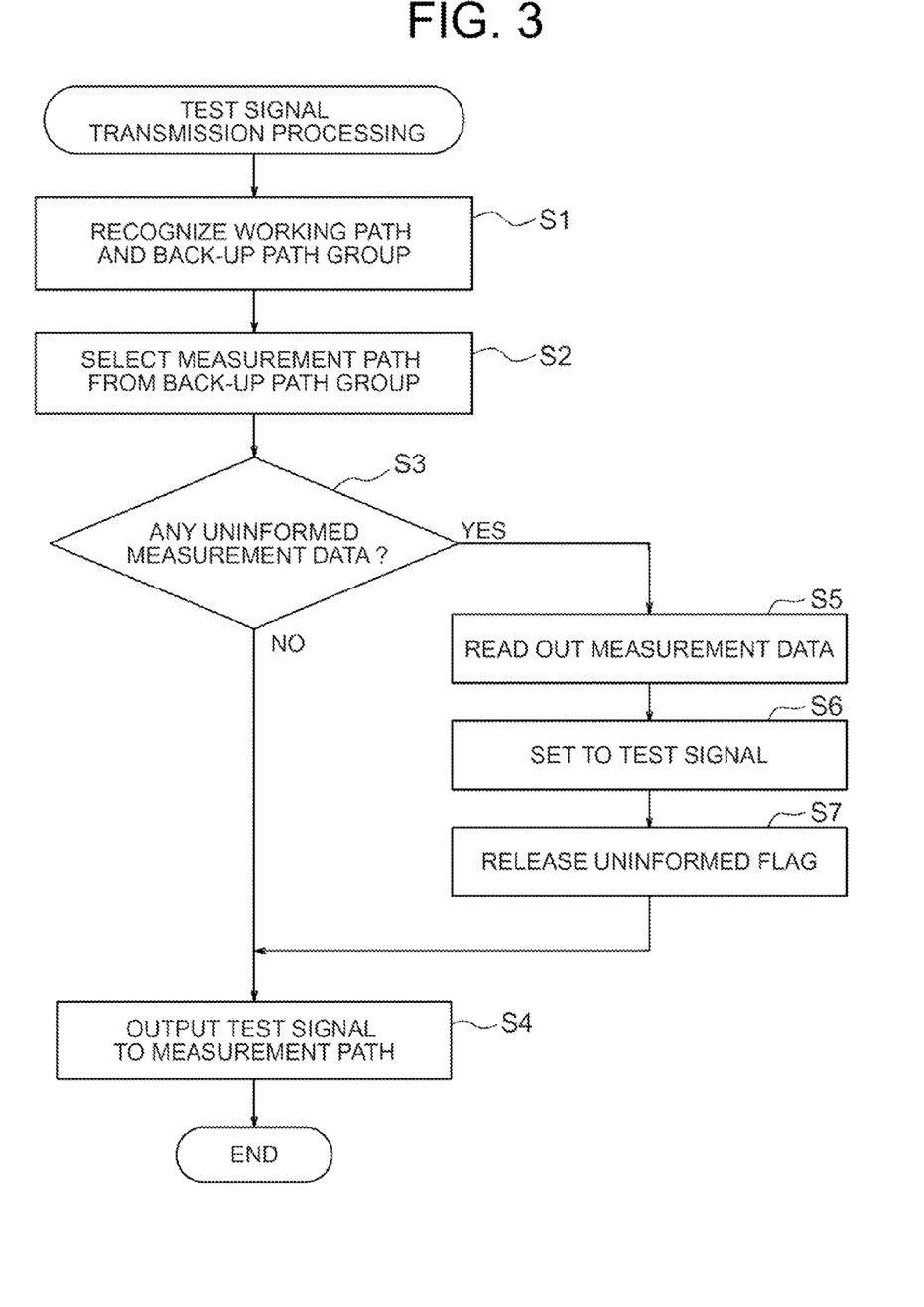
FIG. 3 is a flowchart regarding transmission of a test signal according to the exemplary embodiment of the invention.

When the working path at this point remains as the path 4-1, the transmission apparatus 2-1 that has received the test signal 222 from the transmission apparatus 3-1 selects the path 4-3 as a new measurement path for replacing the path 4-2 (FIG. 3: S1, S2). Thereafter, the transmission apparatus 2-1 and the transmission apparatus 3-1 repeat measurement while dynamically switching the back-up paths (4-2 to 4-N) by the above-described procedure, unless there is any switching of the working path 4-1. Thereby, the transmission apparatus 2-1 and the transmission apparatus 3-1 can keep the latest measurement data regarding the back-up path group.

Further, when it becomes necessary to switch the working path, the transmission apparatus 2-1 and the transmission apparatus 3-1 select a back-up path of a still finer communication quality based on the measurement data recorded up to that point, and switch the selected back-up path as a new working path. Therefore, with the exemplary embodiment, it is not especially necessary to check the other communication paths when switching the working path.

SPECIFIC EXAMPLE

Figure 5:
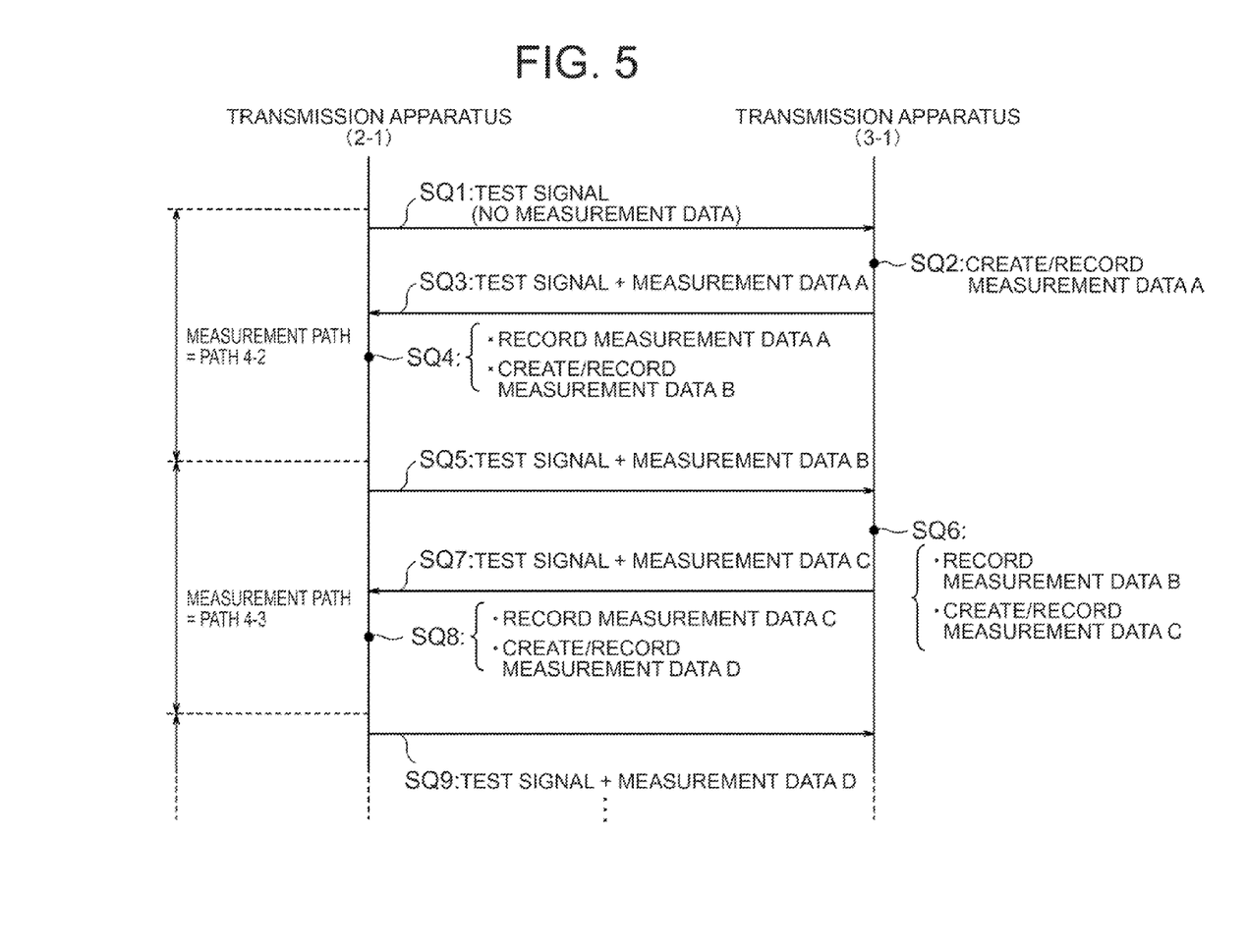
FIG. 5 is a sequence chart regarding transmission and reception of the test signal according to the exemplary embodiment of the invention.

Now, a specific example of transmission/reception of the test signal will be described by referring to a sequence shown in FIG. 5. The transmission apparatus 2-1 recognizes that the back-up path group is constituted with the paths 4-2 to 4-N, and transmits the test signal to the path 4-2 that is selected as the first measurement path (SQ1). The measurement data is not contained in the test signal at this point.

When receiving the test signal described above from the path 4-2, the transmission apparatus 3-1 recognizes that the measurement data is not contained therein. Further, the transmission apparatus 3-1 measures the communication quality by using the received test signal, and creates measurement data A as the measurement result. Thereby, one-way measurement data A of the path 4-2 is recorded in the transmission apparatus 3-1 (SQ2). Thereafter, the transmission apparatus 3-1 recognizes that there is the uninformed measurement data A at the time of transmitting the test signal to the transmission apparatus 2-1. The transmission apparatus 3-1 transmits the test signal to which the measurement data A is added to the path 4-2 (SQ3).

When receiving the test signal from the path 4-2, the transmission apparatus 2-1 extracts and records the measurement data A contained therein. Further, the transmission apparatus 2-1 measures the communication quality by using the received test signal, and creates measurement data B as the measurement result. Thereby, the measurement data A and the measurement data B regarding the path 4-2, i.e., the communication quality of the upstream and downstream of the path 4-2, are recorded in the transmission apparatus 2-1 (SQ4).

Subsequently, the transmission apparatus 2-1 selects the path 4-3 as a new measurement path, and transmits the test signal to which the uninformed measurement data B is added to the transmission apparatus 3-1 (SQ5) via the path 4-3.

When receiving the test signal from the path 4-3, the transmission apparatus 3-1 extracts and records the measurement data B contained therein (SQ6). Thereby, as in the case of the transmission apparatus 2-1, the communication quality of the upstream and downstream of the path 4-2 is recorded also in the transmission apparatus 3-1.

The transmission apparatus 3-1 measures the communication quality by using the test signal received from the path 4-3, and creates measurement data C as the measurement result. Thereby, one-way measurement data C of the path 4-3 as a new measurement path is recorded (SQ6) in the transmission apparatus 3-1. Thereafter, the transmission apparatus 3-1 transmits the test signal to which the measurement data C is added to the path 4-3 (SQ7).

When receiving the test signal from the path 4-3, the transmission apparatus 2-1 extracts and record the measurement data C contained therein. Further, the transmission apparatus 2-1 measures the communication quality by using the received test signal, and creates measurement data D as the measurement result. Thereby, the communication quality of the upstream and downstream of the path 4-3 is recorded in the transmission apparatus 2-1 (SQ8). The transmission apparatus 2-1 transmits the test signal to which the measurement data D is added to the transmission apparatus 3-1 via a new measurement path (SQ9).

Thereafter, the transmission apparatus 2-1 and the transmission apparatus 3-1 execute the measurements of the back-up path group through the above-described procedure. When the working path is switched in the middle of transmission, the paths other than the new working path are recognized as the back-up paths. For example, when the working path is switched from the path 4-1 to the path 4-2, a set of paths (4-1, 4-3 to 4-N) excluding the path 4-2 is recognized as a back-up path group.

Figure 6:
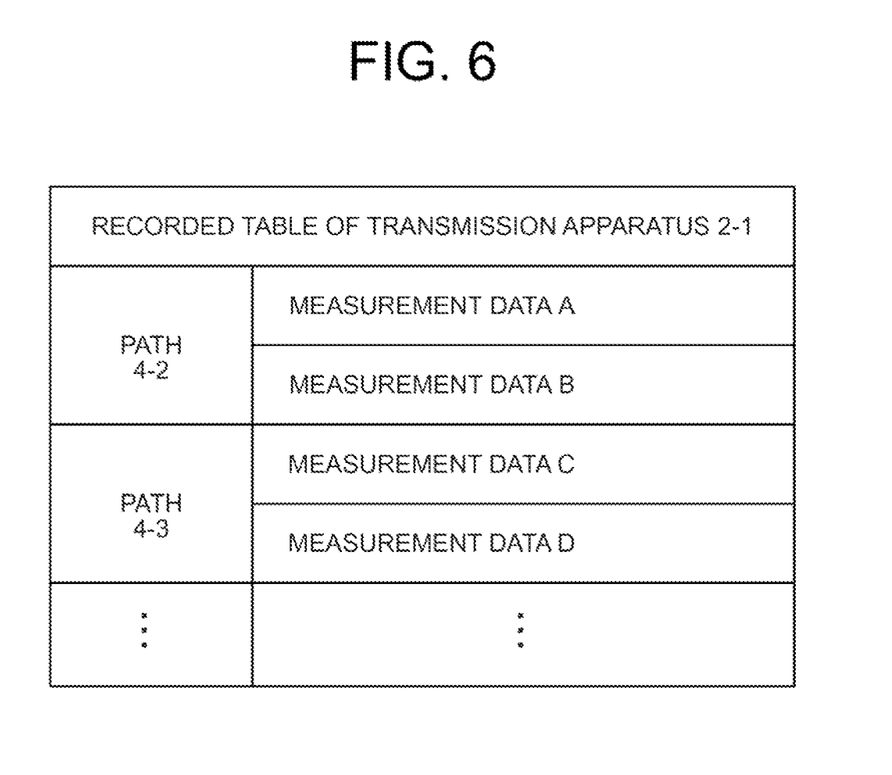
FIG. 6 is an explanatory illustration of a measurement data recorded table according to the exemplary embodiment of the invention.

An example of the measurement data acquired by the sequence is shown in FIG. 6. The table shown therein is recorded by the transmission apparatus 2-1. In this recorded table, the measurement data (B, D) acquired by measurements of the transmission apparatus 2-1 itself and the measurement data (A, C) acquired by the opposing transmission apparatus 3-1 are recorded for each path. The form of recording is not limited only to the one shown therein. For example, it is also possible to add items regarding the order of the communication quality. Through preparing such recorded table, it is possible to determine a proper back-up path that can be replaced with the working path promptly.

Note that the exemplary embodiment is not only capable of monitoring the back-up path group but also capable of monitoring the working path. Operations for monitoring the working path will be described along flowcharts shown in FIG. 7 and FIG. 8. First, an example of the operation of the transmission apparatus 2-1 for transmitting the client signal 11 to the transmission apparatus 3-1 will be described by referring to FIG. 7.

Figure 7:
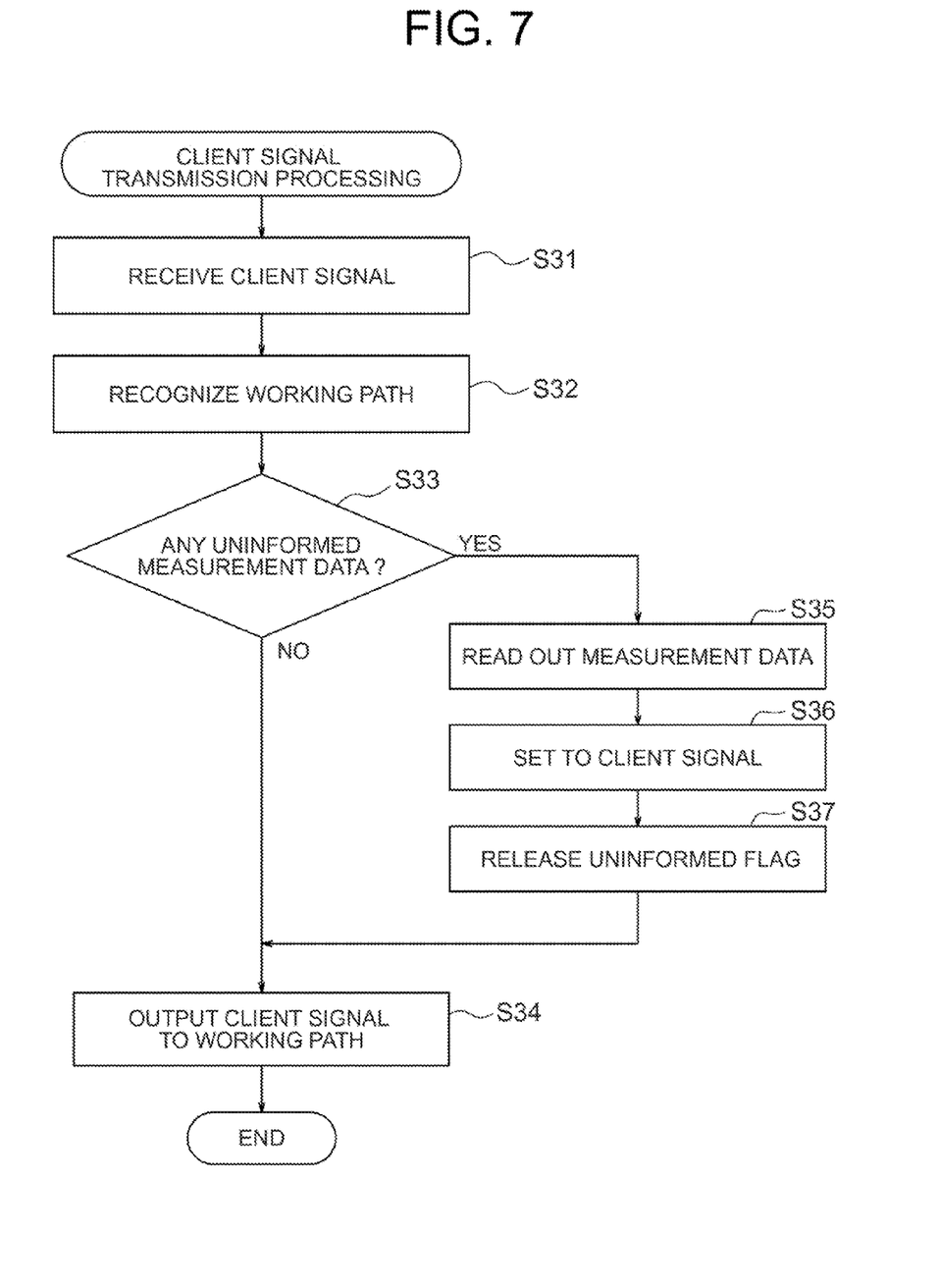
FIG. 7 is a flowchart regarding transmission of a client signal according to the exemplary embodiment of the invention.

When receiving the client signal 11 from the client apparatus 1-1 (step S31), the transmission apparatus 2-1 recognizes the working path used at that point (step S32). Here, the path 4-1 is recognized as a working path.

The transmission apparatus 2-1 checks whether or not the uninformed measurement data for the transmission apparatus 3-1 is recorded. When there is no uninformed measurement data (step S33: No), the transmission apparatus 2-1 transmits the client signal 11 to the transmission apparatus 3-1 via the working path (4-1) (step S34). Further, when there is the uninformed measurement data at the point where the client signal is transmitted (step S33: Yes), the transmission apparatus 2-1 reads it out, adds it to the client signal of this time (steps S35, S46), and releases the uninformed flag (step S37). Then, the transmission apparatus 2-1 transmits the client signal to which the measurement data is added to the transmission apparatus 3-1 (step S34).

Figure 8:
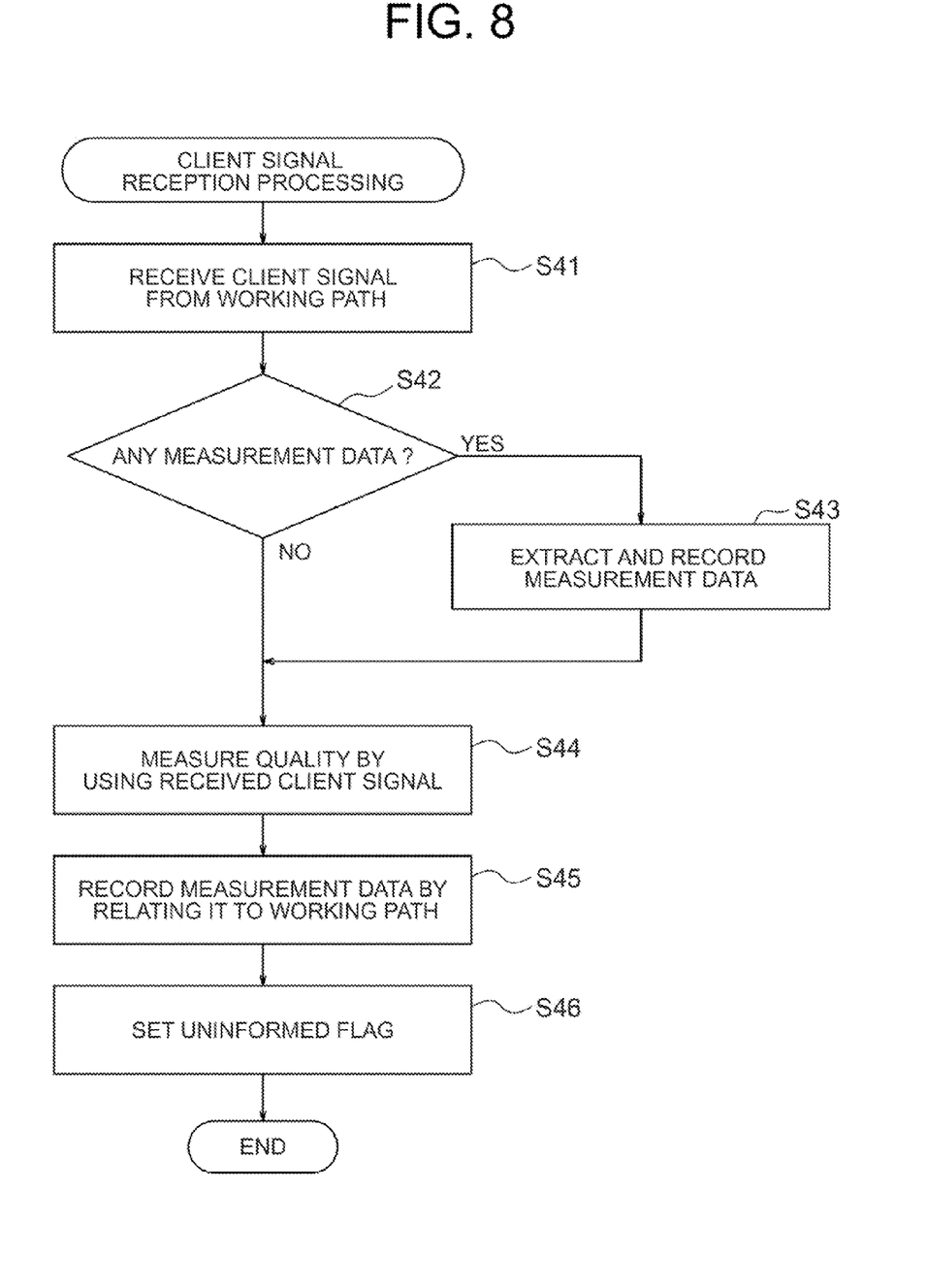
FIG. 8 is a flowchart regarding reception of the client signal according to the exemplary embodiment of the invention.

Referring to FIG. 8, described is an operation of a case where the transmission apparatus 3-1 receives the client signal 11 from the transmission apparatus 2-1. When receiving the client signal 11 from the transmission apparatus 2-1 via the working path (4-1) (step S41), the transmission apparatus 3-1 checks whether or not the measurement data is contained in the client signal 11. When the measurement data is not contained, the transmission apparatus 3-1 performs error correction by FEC (Forward Error Correction code) or the like, transfers it to the client apparatus 1-2, and shifts to a next step (step S42: No).

When the measurement data is contained in the client signal 11 (step S42: Yes), the transmission apparatus 3-1 extracts and records the measurement data before transferring the client signal 11 to the client apparatus 1-2 (step S43). Further, the transmission apparatus 3-1 measures the communication quality by using the received client signal 11 (step S44). The measurement can be done in the same manner as the case of the measurement regarding the back-up path described above. Alternatively, information acquired by error correction processing may be used as well.

The transmission apparatus 3-1 records the measurement data as the measurement result by relating it to the working path (step S45), and sets the above-described uninformed flag to be valid (step S46). Then, the transmission apparatus 3-1 adds the above-described measurement data to the client signal 22 when transmitting the client signal 22 from the client apparatus 1-2 to the transmission apparatus 2-1.

Thereafter, the transmission apparatus 2-1 and the transmission apparatus 3-1 inform the measurement data to each other by the above-described procedure every time when transmitting the client signals (11, 22). Thereby, the latest measurement data regarding the working path can be kept both by the transmission apparatus 2-1 and the transmission apparatus 3-1.

As described above, with this exemplary embodiment, the communication quality of the back-up path group is checked along with the communication of the working path and recorded to each of the transmission apparatuses 2-1 and 3-1. Thus, when it becomes necessary to switch the working path, a proper communication path as a new working path can be determined promptly by referring to the measurement recorded up to that point regarding the back-up path group.

The present invention is not limited only to the exemplary embodiments described above. Various changes can be applied to the exemplary embodiments described above within the scope of the appended claims. For example, the present invention is employed to a WDM (Wavelength Division Multiplexing) system, and a function of changing the wavelength of the test signal is provided to the monitoring control units (2-7, 3-7). The monitoring control units (2-7, 3-7) change the wavelength of the test signal successively in a prescribed wavelength band. In that case, a wavelength (unused wavelength) that is not duplicated with the wavelength of the client signal of the working path is employed for the wavelength of the test signal.

More specifically, a wavelength band of 1529.944 nm to 1562.640 nm called C-BAND is used for the test signal, for example. The band is divided into 80 channels at an interval of about 0.4 nm, and applied by being shifted by 1 channel. Further, it is also possible to employ a method which divides a band of 1574.127 nm to 1608.760 nm called L-BAND into 80 channels at an interval of about 0.4 nm. Through conducting measurements by changing the wavelength, the communication quality by each wavelength regarding each back-up path can be recorded. The recorded information can be used for selecting the path when employing the client signal of a new wavelength, for example.

Regarding the transmission timing of the test signal, the transmission apparatus 2-1 and the transmission apparatus 3-1 do not necessarily need to synchronize with each other but can set own timing individually.

The test signal transmission units (2-5, 3-5) and the test signal reception units (2-6, 3-6) may be connected outside of the transmission apparatuses instead of being built inside the transmission apparatuses (2-1, 3-1).

In the exemplary embodiments described above, the system 100 is an optical communication system. However, application of the present invention is not limited only to the optical communication.

In the explanations above, the signal transmission unit as well as the signal reception unit, the test signal transmission unit as well as the test signal reception unit, and the monitoring control unit included in the transmission apparatuses 2-1 and 3-1 shown in FIG. 1 are built as hardware. However, the signal transmission unit as well as the signal reception unit, the test signal transmission unit as well as the test signal reception unit, and the monitoring control unit included in the transmission apparatus 2-1 and the signal transmission unit as well as the signal reception unit, the test signal transmission unit as well as the test signal reception unit, and the monitoring control unit included in the transmission apparatus 3-1 may be built as software by causing the computers constituting the transmission apparatuses 2-1 and 3-1 shown in FIG. 1 to execute a communication path monitoring program, respectively.

When constituting those as the program described above, the communication path monitoring program according to the present invention is built as a structure which causes a computer to execute: a function (corresponds to a function executed by the signal transmission unit) which transmits a client signal from a client apparatus to a working path among a plurality of communication paths; a function (corresponds to a function executed by the signal reception unit) which receives the client signal to the client apparatus from the working path; a function (corresponds to a function executed by the test signal transmission unit) which transmits a test signal to a measurement path among a back-up path group other than the working path out of the plurality of communication paths; a function (corresponds to a function executed by the test signal reception unit) which receives the test signal from the measurement path; a function (corresponds to a function executed by the cross connect unit) which connects the path for transmitting the client signal and the path for receiving the client signal to the working path, and connects the path for transmitting the test signal and the path for receiving the test signal to the measurement path; and a function (corresponds to a function executed by the monitoring control unit) which recognizes the working path and the back-up path group from the plurality of communication paths, selects the measurement path from the back-up path group, measures a communication quality by using the received test signal, records data of the measurement, selects a new measurement path from the back-up path group, supplies a test signal containing the recorded measurement data, and records the measurement data when the measurement data is contained in the received test signal. The communication path monitoring program is recorded to a recording medium and treated as a target of commercial transaction.

While the present invention has been described heretofore by referring to the embodiments (and EXAMPLE), the present invention is not limited Only to the embodiments (and EXAMPLE). Various changes and modifications occurred to those skilled in the art can be applied to the structures and details of the present invention without departing from the scope of the present invention.

This Application claims the Priority right based on Japanese Patent Application No. 2009-036432 filed on Feb. 19, 2009 and the disclosure thereof is hereby incorporated by reference in its entirety.

INDUSTRIAL APPLICABILITY

The present invention can contribute to performing prompt path switching between the transmission apparatuses having a plurality of paths existing therebetween.

REFERENCE NUMERALS

100 System
1-1, 1-2 Client apparatus
2-1, 3-1 Transmission apparatus
2-2, 3-2 Signal transmission unit
2-3, 3-3 Signal reception unit
2-4, 3-4 Cross connect unit
2-5, 3-5 Test signal transmission unit
2-6, 3-6 Test signal reception unit
2-7, 3-7 Monitoring control unit
4-1 to 4-N Path
5-1 to 5-N Relay unit

The invention claimed is:

1. A communication path monitoring method, wherein:
a first transmission apparatus and a second transmission apparatus recognize a working path used for transmitting a client signal and a back-up path group other than the working path from a plurality of communication paths between the both apparatuses;
the first transmission apparatus selects a measurement path from the back-up path group, and transmits a test signal to the second transmission apparatus via the measurement path;
the second transmission apparatus measures a communication quality by using the test signal from the first transmission apparatus, records data of the measurement, and transmits a test signal containing the recorded measurement data to the first transmission apparatus via the measurement path; and
the first transmission apparatus records the measurement data contained in the test signal from the second transmission apparatus, measures a communication quality by using the test signal from the second transmission apparatus, records the measurement data, selects a new measurement path from the back-up path group, and transmits a test signal containing the recorded measurement data to the second transmission apparatus via the new measurement path.

2. The communication path monitoring method as claimed in claim 1, wherein:
the first transmission apparatus transmits a client signal to the second transmission apparatus via the working path;
the second transmission apparatus measures a communication quality by using the client signal from the first transmission apparatus, records data of the measurement, and adds the recorded measurement data to a client signal when transmitting the client signal to the first transmission apparatus; and
the first transmission apparatus records the measurement data contained in the client signal from the second transmission apparatus, measures a communication quality by using the client signal from the second transmission apparatus, records data of the measurement, and adds the recorded measurement data to a new client signal when transmitting the new client signal to the second transmission apparatus.

3. The communication path monitoring method as claimed in claim 1, wherein:
when switching the working path to a new communication path, the first transmission apparatus and the second transmission apparatus select a communication path of a still higher communication quality from the back-up path group based on the recorded measurement data, and recognize the selected communication path as the new communication path.

4. The communication path monitoring method as claimed in claim 1, wherein the plurality of communication paths are optical communication paths.

5. The communication path monitoring method as claimed in claim 4, wherein:
every time when selecting the new measurement path, the first transmission apparatus and the second transmission apparatus successively transmit a plurality of test signals of different optical wavelengths to the new measurement path.

6. A transmission apparatus, comprising:
a signal transmission unit which transmits a client signal from a client apparatus to a working path among a plurality of communication paths;
a signal reception unit which receives a client signal to the client apparatus from the working path;
a test signal transmission unit which transmits a test signal to a measurement path among a back-up path group other than the working path out of the plurality of communication paths;
a test signal reception unit which receives a test signal from the measurement path;
a cross connect unit which connects the signal transmission unit and the signal reception unit to the working path, and connects the test signal transmission unit and the test signal reception unit to the measurement path; and
a monitoring control unit which recognizes the working path and the back-up path group from the plurality of communication paths, selects the measurement path from the back-up path group and informs the selection to the cross connect unit, measures a communication quality by using the received test signal, records data of the measurement, selects a new measurement path from the back-up path group and informs the selection to the cross connect unit, supplies a test signal containing the recorded measurement data to the test signal transmission unit, and records the measurement data when the measurement data is contained in the received test signal.

7. The transmission apparatus as claimed in claim 6, wherein:
the monitoring control unit measures a communication quality by using the received client signal, records data of the measurement, supplies the measurement data to the signal transmission unit, and records the measurement data when the measurement data is contained in the received client signal; and
the signal transmission unit adds the supplied measurement data to a client signal when transmitting the client signal to the working path.

8. The transmission apparatus as claimed in claim 6, wherein:

when switching the working path to a new communication path, the monitoring control unit selects a communication path of a still higher communication quality from the back-up path group based on the recorded measurement data, and informs the selected communication path to the cross connect unit as the new communication path.

9. The transmission apparatus as claimed in claim 6, wherein the plurality of communication paths are optical communication paths.

10. The transmission apparatus as claimed in claim 9, wherein:

every time when selecting the new measurement path, the monitoring control unit successively transmits a plurality of test signals of different optical wavelengths to the new measurement path.

11. A transmission apparatus, comprising:

signal transmission means for transmitting a client signal from a client apparatus to a working path among a plurality of communication paths;

signal reception means for receiving a client signal to the client apparatus from the working path;

test signal transmission means for transmitting a test signal to a measurement path among a back-up path group other than the working path out of the plurality of communication paths;

test signal reception means for receiving a test signal from the measurement path;

cross connect means for connecting the signal transmission means and the signal reception means to the working path, and connecting the test signal transmission means and the test signal reception means to the measurement path; and monitoring control means for recognizing the working path and the back-up path group from the plurality of communication paths, selecting the measurement path from the back-up path group and informing the selection to the cross connect means, measuring a communication quality by using the received test signal, recording data of the measurement, selecting a new measurement path from the back-up path group and informing the selection to the cross connect means, supplying a test signal containing the recorded measurement data to the test signal transmission means, and recording the measurement data when the measurement data is contained in the received test signal.

\* \* \* \* \*